(12) United States Patent
Wentink

(10) Patent No.: US 8,396,015 B2
(45) Date of Patent: *Mar. 12, 2013

(54) SCANNING THRESHOLD

(75) Inventor: Maarten Menzo Wentink, Utrecht (NL)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,924

(22) Filed: Dec. 13, 2011

(65) Prior Publication Data

US 2012/0093026 A1 Apr. 19, 2012

Related U.S. Application Data

(63) Continuation of application No. 12/110,888, filed on Apr. 28, 2008, now Pat. No. 8,077,647.

(60) Provisional application No. 60/970,189, filed on Sep. 5, 2007.

(51) Int. Cl.
*G08C 17/00* (2006.01)

(52) U.S. Cl. .................... 370/311; 455/574

(58) Field of Classification Search .............. None
See application file for complete search history.

(56) References Cited

U.S. PATENT DOCUMENTS

| | | | |
|---|---|---|---|
| 6,002,918 A | 12/1999 | Heiman et al. | |
| 6,829,288 B2 | 12/2004 | Orava | |
| 7,251,235 B2 | 7/2007 | Wentink | |
| 7,440,416 B2 | 10/2008 | Mahany et al. | |
| 7,542,437 B1 * | 6/2009 | Redi et al. ............. | 370/311 |
| 7,583,639 B2 | 9/2009 | Mahany | |
| 7,672,264 B2 * | 3/2010 | Babin .................... | 370/318 |
| 2004/0062200 A1 * | 4/2004 | Kesavan .................. | 370/235 |
| 2005/0036469 A1 | 2/2005 | Wentink | |
| 2005/0122927 A1 | 6/2005 | Wentink | |
| 2005/0135295 A1 | 6/2005 | Walton et al. | |
| 2005/0185738 A1 | 8/2005 | Gaikwad | |
| 2005/0220145 A1 | 10/2005 | Nishibayashi et al. | |
| 2007/0036097 A1 | 2/2007 | Costa et al. | |
| 2007/0105600 A1 | 5/2007 | Mohanty et al. | |
| 2007/0268872 A1 * | 11/2007 | Cromer et al. ............. | 370/338 |
| 2008/0056201 A1 | 3/2008 | Bennett | |
| 2009/0080377 A1 | 3/2009 | Ganguly et al. | |
| 2009/0137206 A1 | 5/2009 | Sherman et al. | |
| 2009/0189981 A1 | 7/2009 | Siann et al. | |
| 2009/0207826 A1 | 8/2009 | Bitran et al. | |

OTHER PUBLICATIONS

Chinese Patent Office; Office Action, Chinese Application No. 200880105714.1, Jul. 18, 2011.

IEEE P802.11v/D0.05 Draft Amendment to Standard for Information Technology—Telecommunications and Information Exchange between systems—LAN/MAN Specific Requirements, Part 11: Wireless LAN Medium Access Control (MAC) and Physical Layer (PHY) Specifications, Amendment v: Wireless Network Management; Prepared by IEEE 802.11, Working Group of the IEEE Committee; Sep. 2006.

U.S. Patent and Trademark Office, International Search Report, PCT Application No. PCT/US2008/075184, Nov. 14, 2008.

(Continued)

*Primary Examiner* — Robert Scheibel
(74) *Attorney, Agent, or Firm* — Jackson Walker L.L.P.; Christopher J. Rourk

(57) ABSTRACT

Included are embodiments for utilizing a scanning threshold. More specifically, one embodiment of a method includes entering a standby mode, wherein in the standby mode, at least one component of a communications device is shutdown, and wherein in the standby mode, at least one channel is scanned to determine potential interference and monitoring exchanged traffic with the communications device. Some embodiments include determining a relative volume of the exchanged traffic, compared to a predetermined threshold and based on the determination of the relative volume of the exchanged traffic and the predetermined threshold, entering a power save standby mode, wherein in the power save standby mode, scanning of the at least one channel is terminated.

20 Claims, 5 Drawing Sheets

OTHER PUBLICATIONS

U.S. Patent and Trademark Office, Written Opinion, PCT Application No. PCT/US2008/075184, Nov. 14, 2008.

International Bureau of WIPO, International Preliminary Report on Patentability, PCT Applicaton No. PCT/US2008/075184, Mar. 9, 2010.

IEEE Standard for Information technology-Telecommunications and information exchange between systems-Local and metropolitan area networks-Specific requirements, Part 11: Wireless LAN Medium Access Control (MAC) and Physical Layer (PHY) Specifications, Jun. 12 2007, IEEE Computer Society, IEEE Std. 802.11-2007.

* cited by examiner

SCANNING THRESHOLD

CROSS REFERENCE

The present application is a continuation of U.S. Ser. No. 12/110,888, now U.S. Pat. No. 8,077,647, filed Apr. 28, 2008, entitled "SCANNING THRESHOLD" which is hereby incorporated by reference for all purposes. This application also claims the benefit of U.S. Provisional Application No. 60/970,189, filed Sep. 5, 2007, which is incorporated by reference in its entirety.

BACKGROUND

As electronic communications have evolved, communications devices have become more mobile. The utilization of one or more wireless protocols has facilitated this evolution of wireless communication. However, while the mobility of wireless devices has been a draw for many users, a wireless power source can be a limiting factor in use of such devices. As many wireless devices utilize wireless power sources, such as batteries, that can only store a limited amount of energy, power conservation techniques are desired for many of these devices.

SUMMARY

Included are embodiments for utilizing a scanning threshold. More specifically, one embodiment of a method includes entering a standby mode, wherein in the standby mode, at least one component of a communications device is shutdown, and wherein in the standby mode, at least one channel is scanned to determine potential interference and monitoring exchanged traffic with the communications device. Some embodiments include determining a relative volume of the exchanged traffic, compared to a predetermined threshold and based on the determination of the relative volume of the exchanged traffic and the predetermined threshold, entering a power save standby mode, wherein in the power save standby mode, scanning of the at least one channel is terminated.

Also included are embodiments of a computer readable medium. One embodiment includes means for entering a standby mode, wherein in the standby mode, at least one component of a communications device is shutdown, and wherein in the standby mode, at least one channel is scanned to determine potential interference and means for monitoring exchanged traffic with the communications device. Some embodiments include means for determining a relative volume of the exchanged traffic, compared to a predetermined threshold and means for, based on the determination of the relative volume of the exchanged traffic and the predetermined threshold, entering a power save standby mode, wherein in the power save standby mode, scanning of the at least one channel is terminated.

Also included are embodiments of a system. At least one embodiment includes means for entering a standby mode, wherein in the standby mode, at least one component of a communications device is shutdown, and wherein in the standby mode, at least one channel is scanned to determine potential interference and means for monitoring exchanged traffic with the communications device. Some embodiments include means for determining a relative volume of the exchanged traffic, compared to a predetermined threshold and means for, based on the determination of the relative volume of the exchanged traffic and the predetermined threshold, entering a power save standby mode, wherein in the power save standby mode, scanning of the at least one channel is terminated.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Generally speaking, communications devices may be configured to facilitate communications in any of a plurality of protocols. In an effort to facilitate such communications, wireless fidelity (WIFI) was developed. WIFI (e.g., IEEE 802.11) has taken a plurality of revisions, one of which is version 802.11n. According to the protocol, IEEE 802.11n compatible communications devices that support 40 MHz channels in a 2.4 GHz band may be required to periodically perform a channel scan, to determine whether a surrounding environment contains no other networks which would potentially experience negative interference from the 40 MHz network. If such a network is detected during the scan, the communications device may report this to an associated access point, after which the access point can reduce the channel bandwidth to 20 MHz. While this may facilitate efficient operation of the network, this periodic scanning requirement may impose a significant power consumption requirement on communications devices that are operating in a standby mode.

Embodiments disclosed herein may be configured to exempt communications devices operating in standby mode from the scanning requirement when they have transmitted and/or received less than a certain amount of data during a certain period of time. Such a non-zero threshold may be utilized because stations in standby mode rarely entirely cease transmitting and receiving data. As a nonlimiting example, a connection with a session initiation protocol (SIP) server may be periodically refreshed, or connection with the server may time out. The same may be true for address resolution protocol (ARP) "keepalive" messages.

Figure 1:
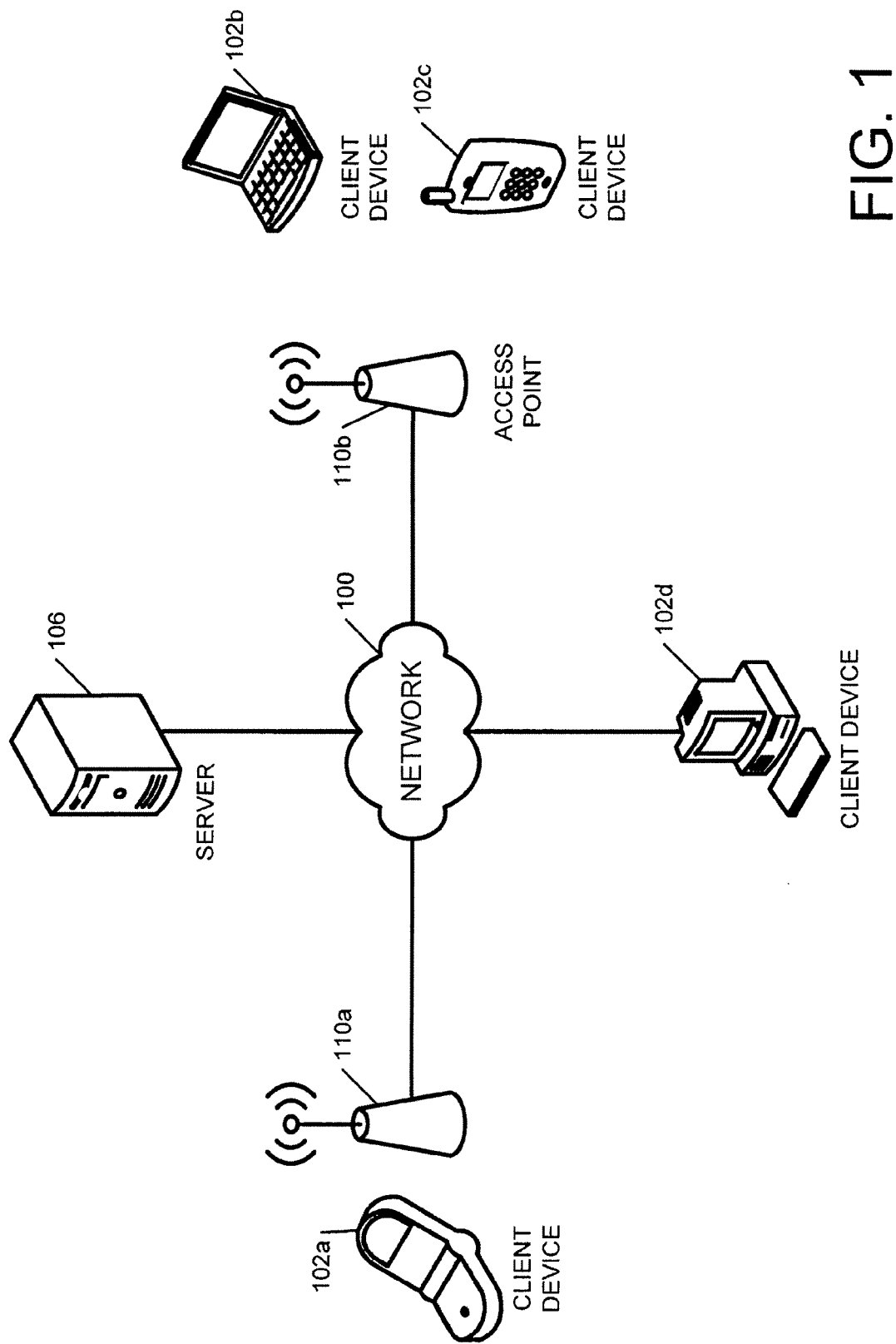
FIG. 1 depicts a diagram illustrating an exemplary embodiment of a network configuration that may be utilized for wireless communications.

Referring to the drawings, FIG. 1 depicts a diagram illustrating an exemplary embodiment of a network configuration that may be utilized for wireless communications. As illustrated in the nonlimiting example from FIG. 1, network 100 may be coupled to access points 110a and 110b. The access points 110a and 110b can be configured to provide wireless communications to communications devices 102a, 102b, 102c and/or 102d. More specifically, depending on the particular configuration, access points 110a and/or 110b may be configured for providing voice over internet protocol (VoIP) services, WIFI services, WiMAX services, wireless session initiation protocol (SIP) services, bluetooth services and/or other wireless communication services. Additionally coupled to the network 100 is a server 106. The server 106 may be configured as a web server, SIP server, and/or other type of server.

The network 100 may include a public switched telephone network (PSTN), an integrated services digital network (ISDN), the Internet, a cellular network, and/or other mediums for communicating data between communication devices. More specifically, while the communications devices 102a and 102d may be configured for WIFI communications, communications devices 102c, 102d, and/or 106 may be coupled to the network 100 and may be configured for VoIP communications, Bluetooth communications, WIFI communications, and/or other wireline and/or wireless communications.

Figure 2:
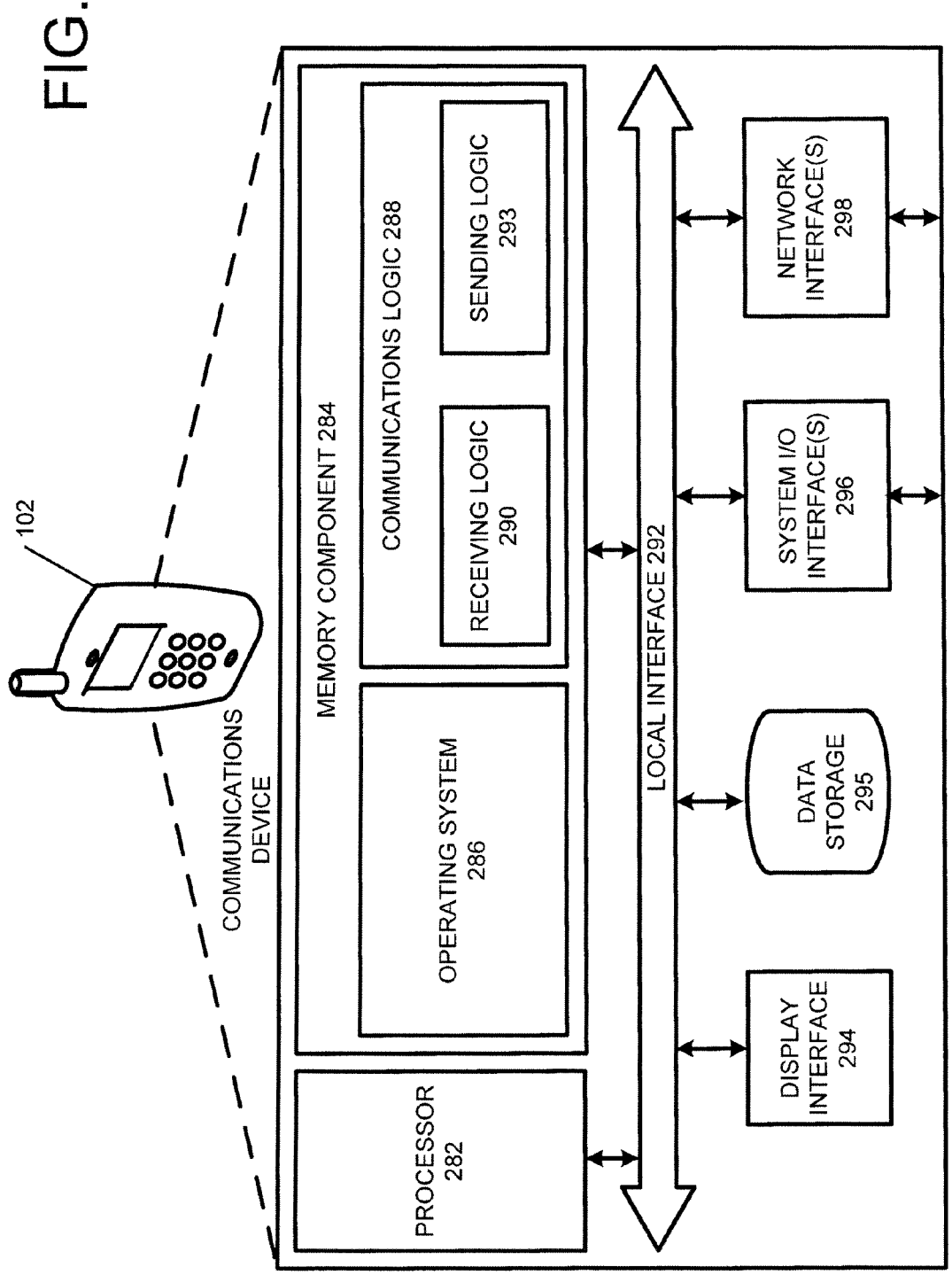
FIG. 2 depicts a functional block diagram illustrating a communications device, similar to the communications device from FIG. 1.

FIG. 2 depicts a functional block diagram illustrating a communications device, similar to the communications device 102 from FIG. 1. As illustrated in FIG. 2, in terms of hardware architecture, the communications device 102 may include a processor 282, a memory component 284, a display interface 294, a data storage component 295, and one or more input and/or output (I/O) device interface(s) 296 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a hardware device for executing software, particularly software stored in the memory component 284.

The processor 282 can be any custom made or commercially available processor, a central processing unit (CPU), an auxiliary processor among several processors associated with the communications device 102, a semiconductor based microprocessor (in the form of a microchip or chip set), a macroprocessor, or generally any device for executing instructions.

The memory component 284 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory component 284 may incorporate electronic, magnetic, optical, and/ or other types of storage media. Note that the memory component 284 can also have a distributed architecture, where various components are situated remotely from one another, but can be accessed by the processor 282.

The software in the memory component 284 may include one or more separate programs, each of which includes an ordered listing of executable instructions for implementing logical functions. In the example of FIG. 2, the software in the memory component 284 may include power save logic 288, as well as an operating system 286. As illustrated, the power save logic 288 may include entering logic 290 configured to enter a standby mode, wherein in the standby mode, at least one component of a communications device is shutdown, and wherein in the standby mode, at least one channel is scanned to determine potential interference.

Similarly, the power save logic 288 may include monitoring logic 292 configured to monitor exchanged traffic with the communications device. In some embodiments the monitoring logic 292 may also be configured to exclude broadcast and/or multicast data. Similarly, in some embodiments, the monitoring logic 292 may be configured to monitor transmitted traffic and received unicast traffic The power save logic 288 may include determining logic 293 configured to determine a relative volume of the exchanged traffic, compared to a predetermined threshold. Similarly, some embodiments may include scanning logic 297 configured to, based on the determination of the relative volume of the exchanged traffic and the predetermined threshold, scan at least one channel for potential interference.

Additionally, while the logic components 290, 291, 293, and 297 are each illustrated in this nonlimiting example as a single piece of logic, these components can include one or more separate software, hardware, and/or firmware modules. Similarly, one or more of these logical components can be combined to provide the desired functionality. Additionally, the operating system 286 may be configured to control the execution of other computer programs and may be configured to provide scheduling, input-output control, file and data management, memory management, and communication control and related services.

A system component embodied as software may also be construed as a source program, executable program (object code), script, and/or any other entity comprising a set of instructions to be performed. When constructed as a source program, the program is translated via a compiler, assembler, interpreter, or the like, which may or may not be included within the volatile and nonvolatile memory 284, so as to operate properly in connection with the operating system 286.

The input/output devices that may be coupled to system I/O Interface(s) 296 may include input devices, for example but not limited to, a keyboard, mouse, scanner, microphone, camera, proximity device, receiver, etc. Further, the input/output devices may also include output devices, for example but not limited to, a printer, display, transmitter, etc. The input/output devices may further include devices that communicate both as inputs and outputs, for instance but not limited to, a modulator/demodulator (modem for accessing another device, system, or network), a radio frequency (RF) or other transceiver, a telephonic interface, a bridge, a router, WIFI communications device, WiMAX communications device, Bluetooth communications device, etc. Similarly, a network interface 298, which is coupled to local interface 292, can be configured to communication with a communications network, such as the network from FIG. 1. While this communication may be facilitated via the communications device 102, this is not a requirement.

More specifically, the network interfaces 298 may be configured for facilitating communication with one or more other devices. The network interface 298 may include any component configured to facilitate a connection with another device. While in some embodiments, among others, the client device 102 can include the network interface 298 that includes a Personal Computer Memory Card International Association (PCMCIA) card (also abbreviated as "PC card") for receiving a wireless network card, this is a nonlimiting example. Other configurations can include the communications hardware within the client device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces. In operation, the wireless network interfaces 298 may be configured to communicate with other client devices 102, access points 110, and other wireless devices via a wireless local area network (WLAN) or other wireless network.

If the communications device 102 is a personal computer, workstation, or the like, the software in the memory component 284 may further include a basic input output system (BIOS) (omitted for simplicity). The BIOS is a set of software routines that initialize and test hardware at startup, start the Operating System 286, and support the transfer of data among the hardware devices. The BIOS is stored in ROM so that the BIOS can be executed when the communications device 102 is activated.

When the communications device 102 is in operation, the processor 282 can be configured to execute software stored within the memory component 284, to communicate data to with the memory component 284, and to generally control operations of the communications device 102 pursuant to the software. Software in memory 284, in whole or in part, may be read by the processor 282, perhaps buffered within the processor 282, and then executed. Additionally, one should note that while the above description is directed to a communications device 102, other devices can also include the components described in FIG. 2.

One should note that the access point 110 (which may also be seen as a communications device) can be configured with one or more of the components and/or logic described above with respect to the communications device 102. Additionally, the access point 110, the communications device 102, and/or other components of FIG. 1 can include other components and/or logic for facilitating the operations described herein. Additionally, depending on the particular configuration, the access point 110 may include both a wireless interface for communicating to the client devices and a second interface for communicating with the network. The access point 110 may be combined with other network services, (e.g., network address translation (NAT), dynamic host control protocol (DHCP), routing, firewall).

Figure 3:
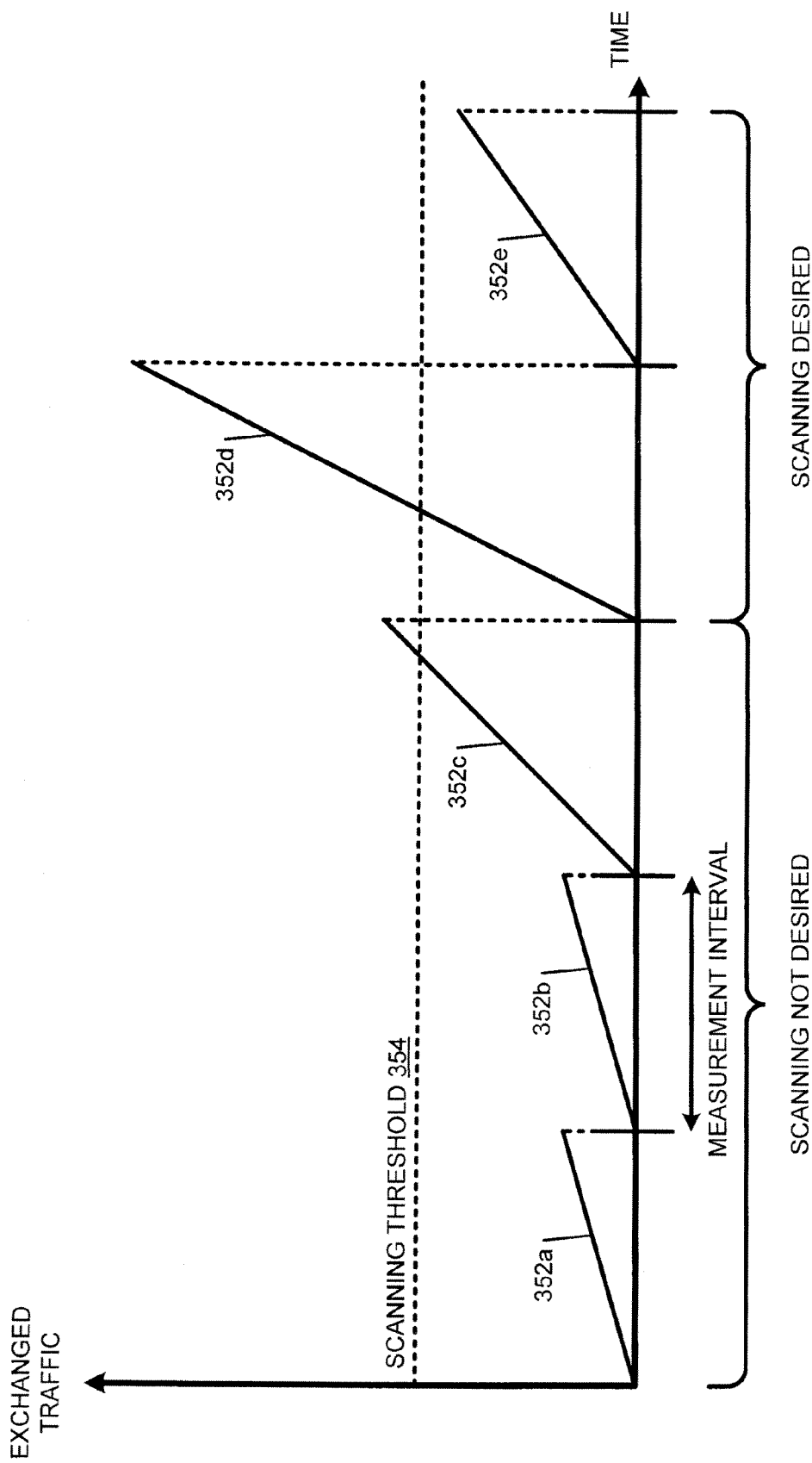
FIG. 3 depicts an exemplary embodiment of a graph for comparing exchanged traffic with a predetermined threshold, such as in the network from FIG. 1.

FIG. 3 depicts an exemplary embodiment of a graph for comparing exchanged traffic 352 with a predetermined threshold 354, such as in the network from FIG. 1. As illustrated in the nonlimiting example of FIG. 3, exchanged data 352a-352e is provided, each measured over a predefined interval. In this nonlimiting example, the communications device 102 may enter a standby mode without scanning for potential interference. As the data traffic 352a is exchanged, a determination is made whether the exchanged data 352a exceeds a predetermined scanning threshold 354. Because the data exchange 352a does not exceed the scanning threshold, no action is taken. Similarly, exchanged data 352b does not exceed the scanning threshold 354, and thus no scanning is activated.

With regard to exchanged data 352c, a determination can be made that this data exceeds the predetermined scanning threshold 354. Upon making this determination, the communications device 102 can begin scanning for interference during the next exchanged data traffic 352d. Similarly, upon exchanging data traffic 352e, a determination can be made that this data traffic is below the predetermined scanning threshold 354. Consequently, during the next exchange of data (not shown), scanning may be disabled.

Figure 4:
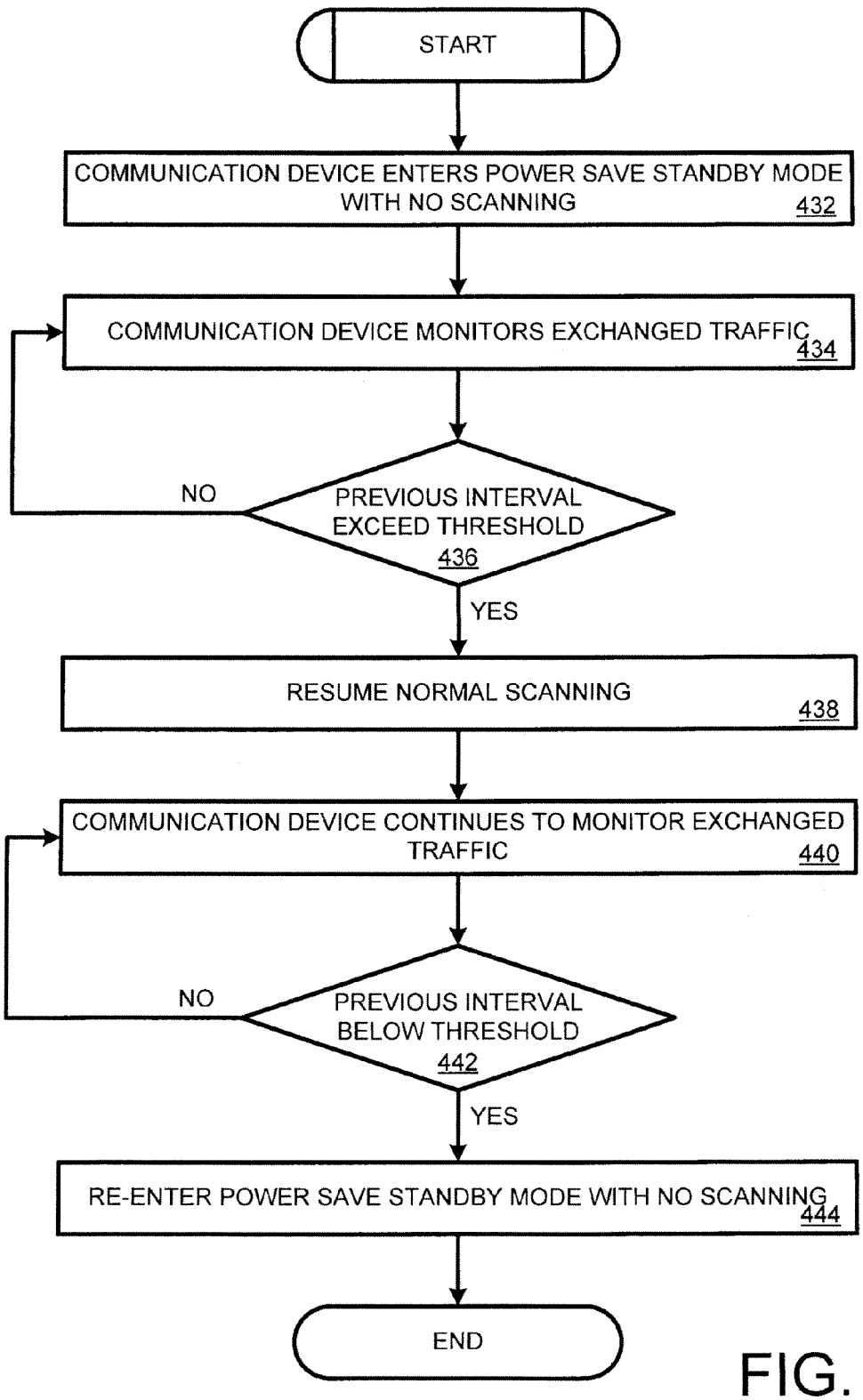
FIG. 4 depicts a flowchart, illustrating an exemplary embodiment of a process for saving power in a communications device, such as the communications device from FIG. 2.

FIG. 4 depicts a flowchart, illustrating an exemplary embodiment of a process for saving power in a communications device, such as the communications device 102 from FIG. 2. As illustrated in the nonlimiting example of FIG. 4, the communications device 102 can enter a standby power save mode with no scanning for potential interference (block 432). The communications device 102 can monitor exchanged traffic (block 434). A determination can then be made whether data exchanged 352 during a previous interval exceeds the scanning threshold 354 (block 436). If the data exchanged 352 does not exceed the scanning threshold 354, the communications device 102 can continue to monitor the exchanged traffic (block 434). If the data exchanged 352 does exceed the scanning threshold, the communications device 102 can resume normal scanning (block 438). One should note that the scanning is may be a periodic event (e.g., the channel does not have to be monitored continuously, and can still be performed while in a power save, but with higher power consumption as a result). The communications device 102 can continue to monitor exchanged traffic (block 440). A determination can be made whether data exchanged 352 during a previous interval is below a scanning threshold (block 442). If the data is not below the scanning threshold, the communications device 102 can continue to monitor exchanged traffic (block 440). If the data 352 exchanged during the previous interval is below the scanning threshold 354, then the communications device 102 can re-enter standby power mode with no scanning (block 444).

Figure 5:
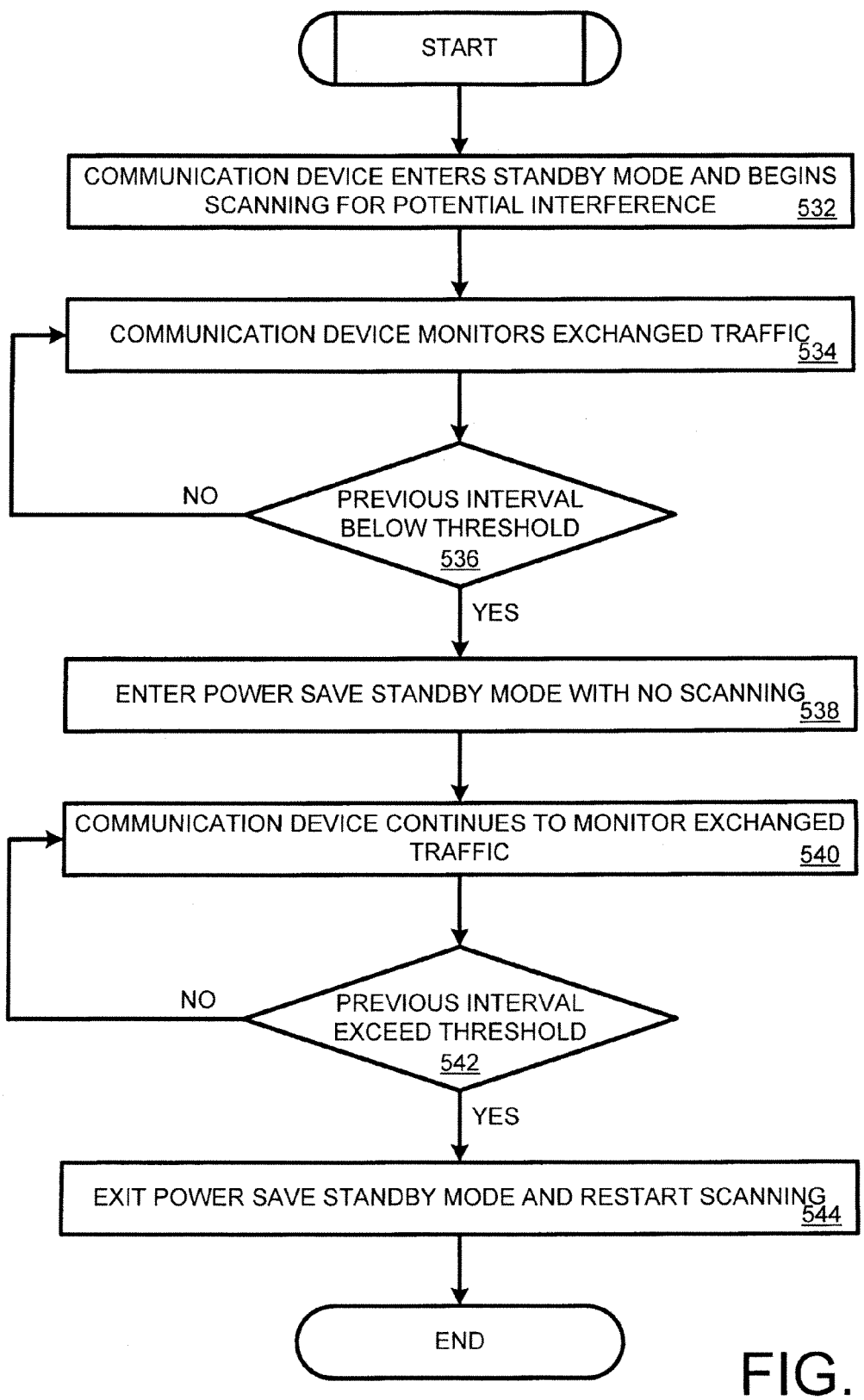
FIG. 5 depicts a flowchart illustrating an exemplary embodiment of another process for saving power in a communications device, similar to the flowchart from FIG. 4.

FIG. 5 depicts a flowchart illustrating an exemplary embodiment of another process for saving power in a communications device 102, similar to the flowchart from FIG. 4. As illustrated in the nonlimiting example of FIG. 5, the communications device 102 can enter standby mode and begin scanning for potential interference (block 532). The communications device 102 can monitor the exchanged traffic 352 (block 534). A determination can be made whether the amount of data exchanged is below the scanning threshold 354 (block 536). If the data exchanged 352 is not below the scanning threshold 354, the communications device can continue to monitor the exchanged traffic (block 534). If, on the other hand, the exchanged data 352 exceeds the scanning threshold 354, the communications device 102 can enter standby power save mode with no scanning (block 538). The communications device 102 can continue to monitor exchanged traffic 352 (block 540). A determination can be made whether the data 352 exchanged in a previous interval exceeds the scanning threshold (block 542). If the data 352 does not exceed the scanning threshold 354, the communications device 102 can continue monitoring the exchanged data 352 (block 540). If, on the other hand, the exchanged data 352 exceeds the scanning threshold 354, the communications device can exit standby power save mode and restart scanning (block 544). One should also note that, depending on the particular configuration, the monitored traffic may exclude received broadcast/multicast traffic.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method, comprising:
   entering a standby mode;
   monitoring, in the standby mode, exchanged traffic with a device;
   determining a relative volume of the exchanged traffic, compared to a predetermined threshold;
   based on the determination of the relative volume of the exchanged traffic and the predetermined threshold, entering a power save standby mode, wherein in the power save standby mode, scanning of at least one channel is terminated; and
   monitoring, in the power save standby mode, the exchanged traffic to determine whether the relative volume of exchanged traffic has changed with regard to the predetermined threshold.

2. The method of claim 1, wherein in power save standby mode, scanning the at least one channel for potential interference is terminated.

3. The method of claim 1, further comprising, in response to determining that the relative volume of exchanged traffic has changed with regard to the predetermined threshold, resuming the scanning of the at least one channel.

4. The method of claim 1, wherein determining whether the exchanged traffic is below a predetermined threshold does not include received broadcast and multicast traffic.

5. The method of claim 1, wherein the device is configured to communicate data in an IEEE 802.11n protocol.

6. The method of claim 1, wherein the device is configured to support at least one 40 MHz channel in a 2.4 GHz frequency band.

7. A non-transitory computer readable medium, comprising:
   entering logic configured to enter a standby mode, wherein in the standby mode, at least one component of a device is shutdown;
   first monitoring logic configured to monitor exchanged traffic with the device while in the standby mode;
   determining logic configured to determine a relative volume of the exchanged traffic, compared to a predetermined threshold;
   scanning logic configured to, based on the determination of the relative volume of the exchanged traffic and the predetermined threshold, enter a power save standby mode, wherein in the power save standby mode, scanning of at least one channel is terminated; and
   second monitoring logic configured to monitor, in the power save standby mode, the exchanged traffic to determine whether the relative volume of exchanged traffic has changed with regard to the predetermined threshold.

8. The computer readable medium of claim 7, wherein the monitoring logic is configured to exclude received broadcast traffic.

9. The computer readable medium of claim 7, wherein the monitoring logic is configured to exclude received multicast traffic.

10. The computer readable medium of claim 7, further comprising power save logic configured to terminate scanning of the at least one channel in response to determining that the relative volume of exchanged traffic has changed with regard to the predetermined threshold.

11. The computer readable medium of claim 7, wherein the device is configured to communicate data in an IEEE 802.11n protocol.

12. The computer readable medium of claim 7, wherein the device is configured to support at least one 40 MHz channel in a 2.4 GHz frequency band.

13. A system, comprising:
means for entering a standby mode;
means for monitoring exchanged traffic with a device;
means for determining a relative volume of the exchanged traffic, compared to a predetermined threshold;
means for, based on the determination of the relative volume of the exchanged traffic and the predetermined threshold, entering a power save standby mode, wherein in the power save standby mode, scanning of at least one channel is terminated; and
means for monitoring, in the power save standby mode, the exchanged traffic to determine whether the relative volume of exchanged traffic has changed with regard to the predetermined threshold.

14. The system of claim 13, wherein the monitoring means is configured to monitor transmitted traffic and received unicast traffic.

15. The system of claim 13, further comprising means for, in response to determining that the relative volume of exchanged traffic has changed with regard to the predetermined threshold, resuming the scanning of the at least one channel.

16. The system of claim 13, wherein the device is configured to communicate data in an IEEE 802.11n protocol.

17. The system of claim 13, wherein the device is configured to support at least one 40 MHz channel in a 2.4 GHz frequency band.

18. The system of claim 13, wherein the means for monitoring is configured to exclude received broadcast and multicast traffic.

19. A system, comprising:
a first component configured to enter a standby mode, wherein in the standby mode, at least one channel is scanned;
a first monitoring component configured to monitor exchanged traffic with a device;
a determining component configured to determine a relative volume of the exchanged traffic, compared to a predetermined threshold;
a second entering component configured to, based on the determination of the relative volume of the exchanged traffic and the predetermined threshold, enter a power save standby mode, wherein in the power save standby mode, scanning of the at least one channel is terminated; and
a second monitoring component configured to monitor, in the power save standby mode, the exchanged traffic to determine whether the relative volume of exchanged traffic has changed with regard to the predetermined threshold.

20. The system of claim 19, further comprising:
a resuming component configured to, in response to determining that the relative volume of exchanged traffic has changed with regard to the predetermined threshold, resume the scanning of the at least one channel.

* * * * *